(12) United States Patent
Johnson et al.

(10) Patent No.: US 6,715,014 B1
(45) Date of Patent: Mar. 30, 2004

(54) MODULE ARRAY

(75) Inventors: Leith L Johnson, Ft Collins, CO (US); Michael H. Cogdill, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/578,964

(22) Filed: May 25, 2000

(51) Int. Cl.[7] .................................................. G06F 1/00
(52) U.S. Cl. .......................... 710/105; 710/107; 711/5; 711/173; 365/30
(58) Field of Search ................................. 710/104–106, 710/107; 711/5, 154, 170, 173; 365/52, 63, 226; 326/30, 86, 90, 83

(56) References Cited

U.S. PATENT DOCUMENTS

| | | | | |
|---|---|---|---|---|
| 5,260,892 A | | 11/1993 | Testa .............................. 365/63 |
| 5,467,455 A | * | 11/1995 | Gay et al. .................... 710/107 |
| 6,026,456 A | * | 2/2000 | Ilkbahar ...................... 710/101 |
| 6,122,695 A | * | 9/2000 | Cronin ......................... 710/126 |
| 6,154,047 A | * | 11/2000 | Taguchi ........................ 326/30 |
| 6,184,730 B1 | * | 2/2001 | Kwong et al. ............... 327/108 |
| 6,184,737 B1 | * | 2/2001 | Taguchi ....................... 327/319 |
| 6,229,335 B1 | * | 5/2001 | Huang et al. ................. 326/30 |
| 6,297,663 B1 | * | 10/2001 | Matsuoka et al. ............ 326/30 |
| 6,308,232 B1 | * | 10/2001 | Gasbarro ..................... 710/100 |
| 6,317,465 B1 | * | 11/2001 | Akamatsu et al. .......... 375/257 |
| 6,323,673 B1 | * | 11/2001 | Starr ............................ 326/30 |
| 6,357,018 B1 | * | 3/2002 | Stuewe et al. ................ 714/37 |
| 6,362,996 B2 | * | 3/2002 | Chang .......................... 365/52 |
| 6,480,030 B1 | * | 11/2002 | Taguchi ........................ 326/86 |

FOREIGN PATENT DOCUMENTS

| WO | WO 97/15012 | * | 4/1997 | ............ G06F/13/40 |
|---|---|---|---|---|

* cited by examiner

*Primary Examiner*—Paul R. Myers
*Assistant Examiner*—Raymond N Phan
(74) *Attorney, Agent, or Firm*—Alexander J. Neudeck

(57) ABSTRACT

A module array includes a lead-in transmission line from a driving source. The lead-in transmission line ends with a series impedance between the lead-in transmission line and a star node. The star node has a terminating impedance between it and a termination voltage. At least two branch transmission lines diverge from the star node. Modules connect to the branch transmission lines in a comb topology.

10 Claims, 3 Drawing Sheets

MODULE ARRAY

FIELD OF THE INVENTION

This invention relates generally to backplanes in computers and other electronic devices and more particularly to memory backplanes that use memory modules.

BACKGROUND OF THE INVENTION

Many electronic devices, such as computers, use arrays of memory modules inserted into sockets along a backplane to store digital information. Two common types of memory modules are SIMMs (Single Inline Memory Modules) and DIMMs (Dual Inline Memory Modules). Memory modules tend to use less board space and are more compact than some memory-mounting arrangements. These modules also allow memory capacity to be increased by replacing modules or inserting additional modules.

Unfortunately, some ways of connecting signals to an array of memory modules can cause signal integrity problems. For example, if a "comb topology" is used as shown in FIG. 1, then the wavefront of the signal driven to the memory modules degrades at each junction. This causes the signal at the last memory modules to have signal characteristics similar to those shown in the shape shown in FIG. 2. The ripples and bumps shown on the rising and falling edges of the waveform in FIG. 2 are problematic. These non-ideal edges are particularly problematic for source synchronous systems, such as DDR (double data rate synchronous) DRAM. In a source synchronous system, the non-ideal edges can lead to false latching of signals. Furthermore, each module of the comb topology receives the driven signal with a different propagation delay. This has the effect of reducing timing budgets. Finally, each module of the comb topology has receives a different shaped signal and this makes analysis and verification of the electrical properties of the array of memory modules more difficult.

Accordingly, there is a need in the art for a memory module array design that helps optimize the signal characteristics of signals received by each module in the array and also helps optimize the cost of implementing the memory module array.

SUMMARY OF THE INVENTION

A preferred embodiment of the invention utilizes a hybrid topology that helps improve the signal characteristics of signals received by industry standard open stub memory modules or other types of modules. A memory or other module array according to the invention includes a lead-in transmission line from a driving source. The lead-in transmission line ends with a series impedance between the lead-in transmission line and a star node. The star node has a terminating impedance between it and a termination voltage. At least two branch transmission lines diverge from the star node. Modules connect to the branch transmission lines in a comb topology.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
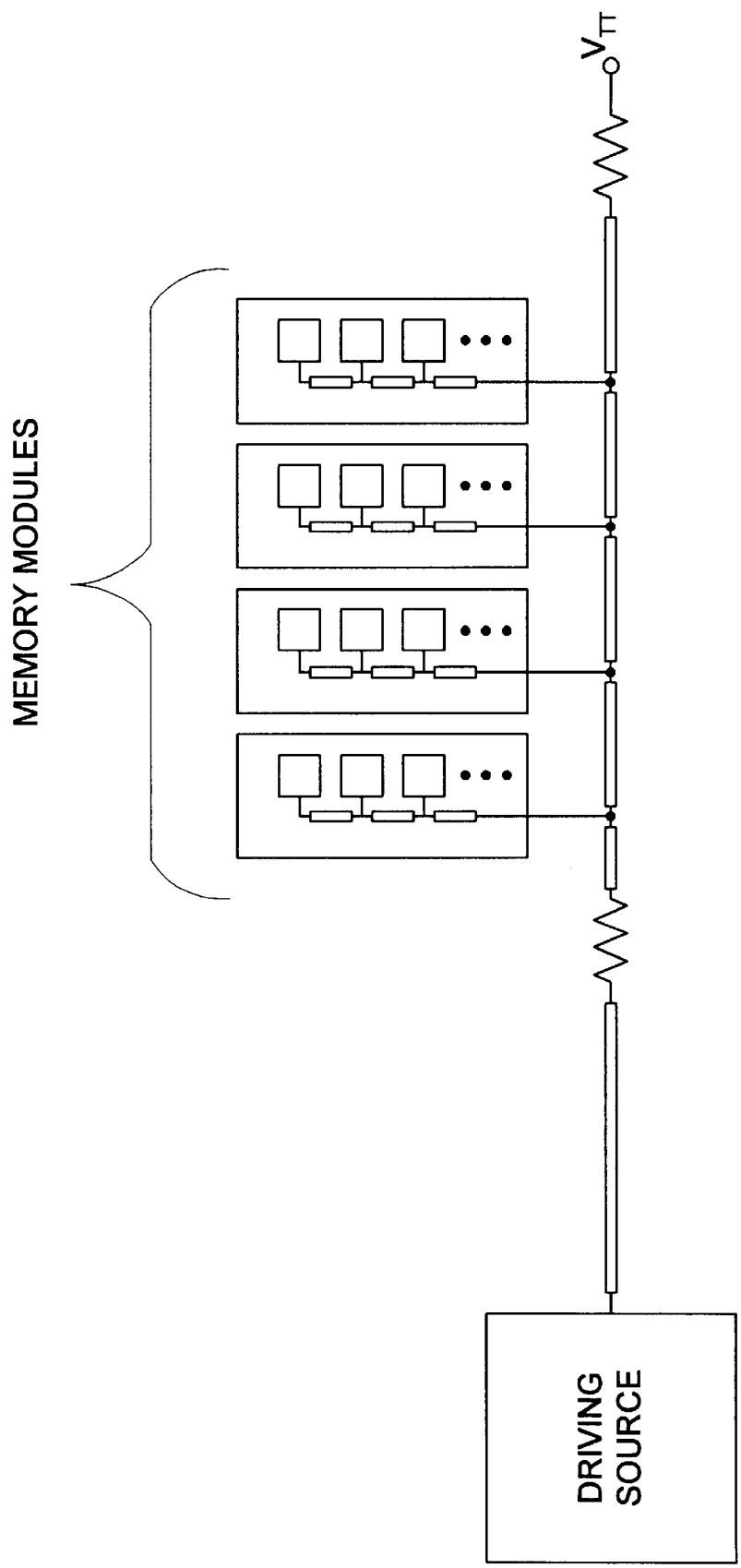
FIG. 1 is an illustration of a module array utilizing a comb topology.
Figure 2:
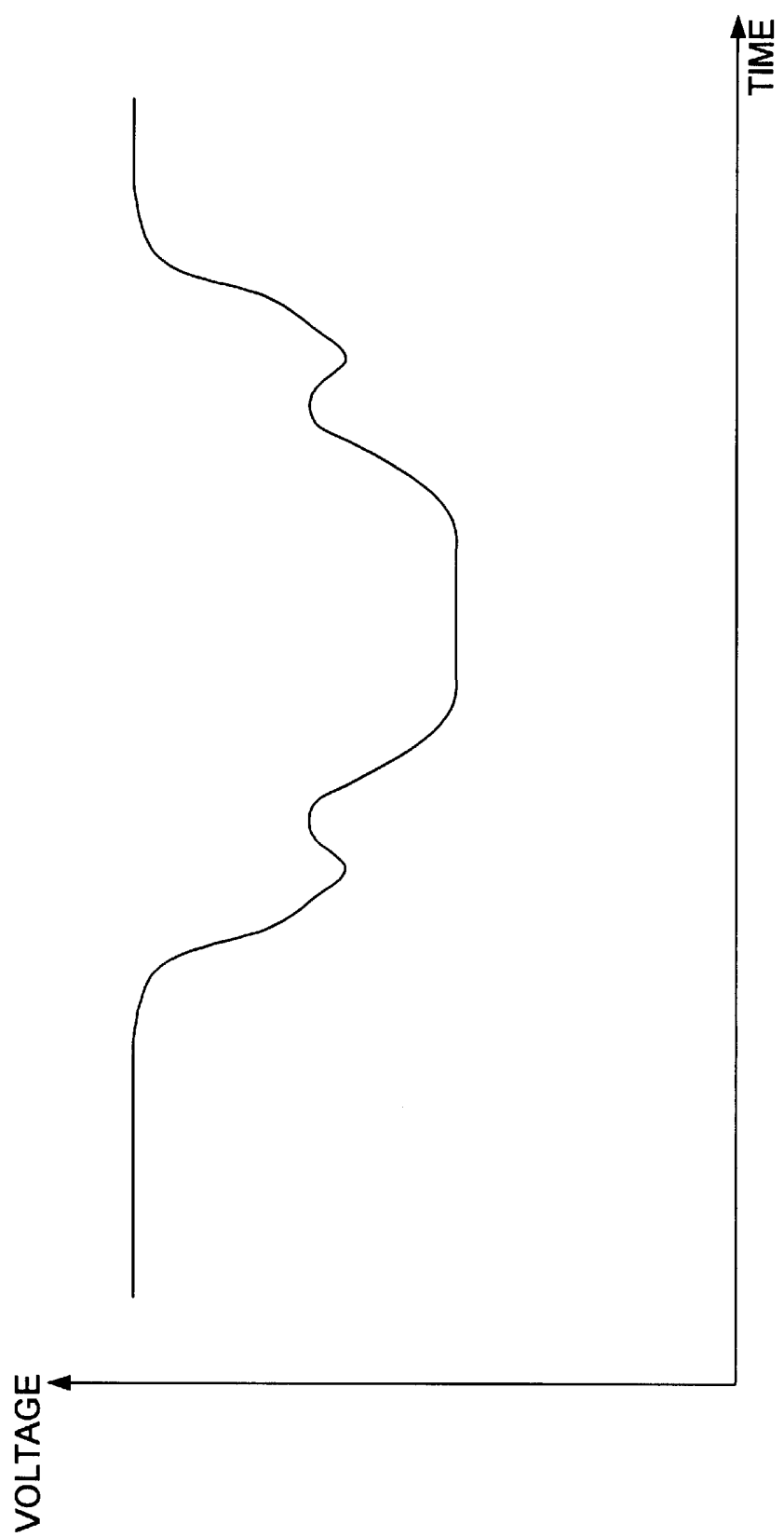
FIG. 2 is an illustration of a signal waveform having undesirable signal characteristics similar to those caused by the comb topology.
Figure 3:
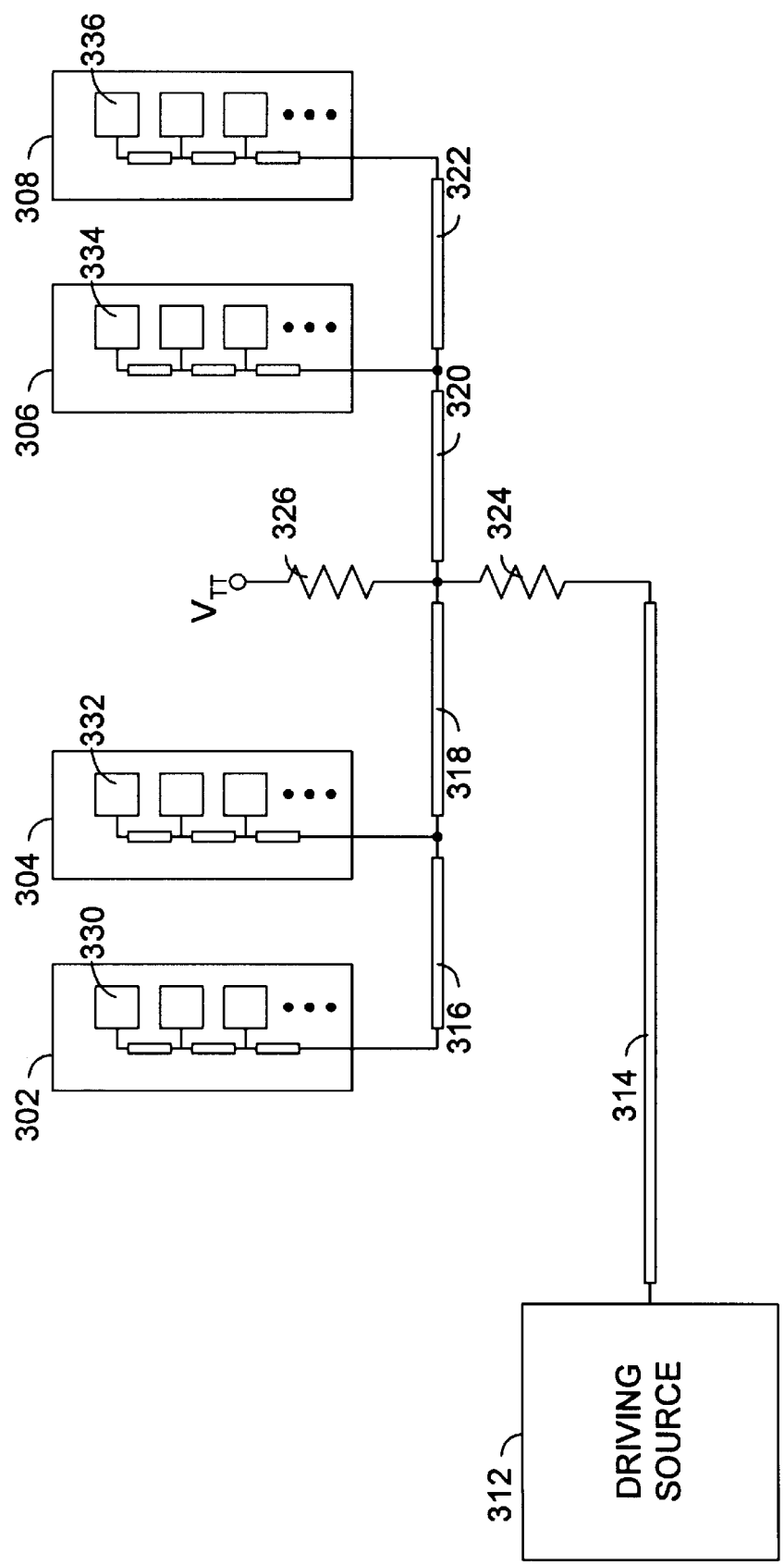
FIG. 3 is an illustration of a star-stub memory module array.

FIG. 3 is an illustration of a star-stub module array. In FIG. 3, a driving source 312 drives a lead-in transmission line 314. The other end of lead-in transmission line 314 is connected to a first terminal of termination resistor 324. A second terminal of termination resistor 324 is connected to a first terminal of termination resistor 326, a first branch transmission line 318, and a second branch transmission line 320. A second terminal of termination resistor 326 is connected to a termination voltage, $V_{TT}$. The node at the divergence of branch transmission lines 318 and 320 can be viewed as a star node. In FIG. 3, only two branches are shown diverging from the star node. This is for illustration purposes only and more than two branches may diverge from this star node.

Branch transmission line 318 has one end connected to the star node, and the other end is connected to module 304 and branch transmission line 316. The other end of branch transmission line 316 is connected to module 302. Together, branch transmission lines 318 and 316 and modules 304 and 302 may be viewed as one transmission line connected to two modules in a comb topology. The connections between modules 302, and 306 and branch transmission line 318, 316 may be made through sockets. Such sockets would be of a type designed to be filled with the type of module being plugged into the module array. In FIG. 3, only two modules are shown connected along transmission line 316, 318 in a comb topology. This is for illustration purposes only and more than two modules may be connected to this branch in a comb topology.

Branch transmission line 320 has one end connected to the star node, and the other end is connected to module 306 and branch transmission line 322. The other end of branch transmission line 322 is connected to module 308. Together, branch transmission lines 320 and 322 and modules 308 and 306 may be viewed as one transmission line connected to two modules in a comb topology. The connections between modules 306, and 308 and branch transmission line 320, 322 may be made through sockets. Such sockets would be of a type designed to be filled with the type of module being plugged into the memory module array. In FIG. 3, only two modules are shown connected along transmission line 320, 322 in a comb topology. This is for illustration purposes only and more than two modules may be connected to this branch in a comb topology.

Also shown in FIG. 3 are devices 330, 332, 334, 336 on modules 302, 304, 306, and 308 respectively. These devices may be a number of different types including various types of dynamic RAM (DRAM) which includes synchronous DRAM (SDRAM), and DDR (double data rate synchronous) DRAM, and various types of static RAM (SRAM). These devices may be any type of chip to form different kinds of modules. The types of devices that may be placed on these modules include support chips, such as graphics processors, or even microprocessors. In FIG. 3, there are multiple devices shown connected to the same signal inside the module. This is for illustration purposes only. Zero, one, or more than one device may be connected to a signal inside a module.

From the foregoing it will be appreciated that the star-stub topology provided by the invention helps improve the signal characteristics of signals received by industry standard open stub memory modules or other types of modules. The topology is easier to realize than a pure star topology and provides better signal characteristics that a pure comb topology.

Although a specific embodiment of the invention has been described and illustrated, the invention is not to be limited to the specific forms or arrangements of parts so described and illustrated. The invention is limited only by the claims.

What is claimed is:

1. A module array, comprising:
   a lead-in transmission line from a driving source;
   a series impedance between the lead-in transmission line and a star node;
   a terminating impedance between said star node and a termination voltage; and,
   at least two branch transmission lines diverging from the star node wherein sockets for modules connect to the branch transmission lines in a comb topology.

2. The module array of claim 1 wherein said sockets are for dynamic RAM memory modules.

3. The module array of claim 2 wherein said sockets for said memory modules are filled with dynamic RAM memory modules.

4. The module array of claim 3 wherein said dynamic RAM memory modules are DDR memory modules.

5. The module array of claim 1 wherein said sockets are for said static RAM memory modules.

6. The module array of claim 5 wherein said sockets are filled with static RAM memory modules.

7. A network topology for connecting signals to modules, comprising:
   a star node having at least a first branch and a second branch diverging from said star node;
   a first plurality of module sockets connected along said first branch at chosen intervals;
   a second plurality of module sockets connected along said second branch at chosen intervals;
   a first termination impedance between a signal source and said star node; and,
   a second termination impedance between said star node and a termination voltage.

8. The network topology of claim 7 wherein said first plurality of module sockets are for dynamic RAM memory modules.

9. The network topology of claim 8 wherein said first plurality of module sockets are filled with dynamic RAM memory modules.

10. The network topology of claim 8 wherein said first plurality of module sockets are filled with DDR memory modules.

* * * * *